US011611549B2

(12) United States Patent
Brown et al.

(10) Patent No.: US 11,611,549 B2
(45) Date of Patent: Mar. 21, 2023

(54) SYSTEM AND METHOD OF SECURING ACCESS TO A SECURE REMOTE SERVER AND DATABASE ON A MOBILE DEVICE

(71) Applicant: FSET Inc., Seattle, WA (US)

(72) Inventors: David Brown, Kenora (CA); Al Rivers, Keewatin (CA); Travis Rivers, Kenora (CA)

(73) Assignee: FSET INC, Seattle, WA (US)

( * ) Notice: Subject to any disclaimer, the term of this patent is extended or adjusted under 35 U.S.C. 154(b) by 271 days.

(21) Appl. No.: 16/592,206

(22) Filed: Oct. 3, 2019

(65) Prior Publication Data

US 2021/0105267 A1 Apr. 8, 2021

(51) Int. Cl.
*H04L 9/40* (2022.01)
*G06F 21/62* (2013.01)

(52) U.S. Cl.
CPC ...... *H04L 63/0853* (2013.01); *G06F 21/6218* (2013.01)

(58) Field of Classification Search
CPC .......... H04L 63/0853; G06F 21/6218
USPC ........................................................... 726/6
See application file for complete search history.

(56) References Cited

U.S. PATENT DOCUMENTS

| | | | | |
|---|---|---|---|---|
| 5,546,463 A * | 8/1996 | Caputo | ................... | G06F 21/34 375/220 |
| 5,778,071 A * | 7/1998 | Caputo | ................... | G06F 21/34 375/220 |
| 6,360,321 B1 * | 3/2002 | Gressel | ................... | G06F 21/34 380/259 |
| 6,966,063 B1 * | 11/2005 | Meric | ................... | G06F 13/102 719/321 |
| 8,862,880 B2 * | 10/2014 | Combet | ............. | H04L 63/0421 713/168 |
| 9,699,034 B2 * | 7/2017 | Lee | ......................... | H04L 41/12 |
| 10,021,088 B2 * | 7/2018 | Innes | .................. | H04L 63/0853 |
| 10,122,828 B1 * | 11/2018 | Verma | ..................... | H04L 61/20 |
| 10,360,367 B1 * | 7/2019 | Mossoba | ............... | G06F 3/0673 |
| 10,623,370 B1 * | 4/2020 | Ambareesh | ......... | H04L 63/0272 |
| 10,755,371 B1 * | 8/2020 | Sarpy, Sr. | ............ | G06Q 50/265 |

(Continued)

FOREIGN PATENT DOCUMENTS

| | | | | |
|---|---|---|---|---|
| AU | 2019280105 B1 * | 1/2020 | .......... | G06F 16/958 |
| GB | 2541040 A | 2/2017 | | |
| WO | WO-2021066834 A1 * | 4/2021 | ......... | H04L 63/0272 |

OTHER PUBLICATIONS

Niche Technology, North Wales Police: NicheRMS Powers Service-Wide Mobile Intelligence Delivery, Jan. 14, 2016, one page. (Year: 2016).*

(Continued)

*Primary Examiner* — Luu T Pham
*Assistant Examiner* — Walter J Malinowski
(74) *Attorney, Agent, or Firm* — Julie Langdon (57) ABSTRACT

A new and novel system and method for reliably, securely, and affordably isolating and securing remote access to a secure cloud-based server and database, specifically, a NicheRMS police database, through a secured application, such as the NicheRMS application, over a secure network connection, such as a Citrix Independent Computing Architecture (ICA) connection, wherein the data in the sensitive database is accessed, and only present in a secured workspace and never transmitted locally to the endpoint devices.

20 Claims, 2 Drawing Sheets

(56) References Cited

U.S. PATENT DOCUMENTS

| | | | | |
|---|---|---|---|---|
| 10,817,346 | B1* | 10/2020 | Culp | G06F 21/53 |
| 10,958,640 | B2* | 3/2021 | Divoux | H04L 63/0876 |
| 11,080,385 | B1* | 8/2021 | Angara | H04L 63/08 |
| 11,240,007 | B1* | 2/2022 | Higgins | H04L 9/3268 |
| 2003/0066026 | A1* | 4/2003 | Jaffe | G06F 17/10 |
| | | | | 715/200 |
| 2007/0156670 | A1* | 7/2007 | Lim | G06F 9/468 |
| 2008/0307409 | A1* | 12/2008 | Lu | G06F 21/6245 |
| | | | | 717/174 |
| 2009/0193514 | A1* | 7/2009 | Adams | G06F 21/40 |
| | | | | 726/17 |
| 2010/0180332 | A1* | 7/2010 | Ben-Yochanan | H04L 63/102 |
| | | | | 726/12 |
| 2010/0250497 | A1* | 9/2010 | Redlich | H04L 63/105 |
| | | | | 707/661 |
| 2011/0022812 | A1* | 1/2011 | van der Linden | H04L 67/1097 |
| | | | | 711/163 |
| 2013/0031374 | A1* | 1/2013 | Thom | G06F 21/572 |
| | | | | 713/189 |
| 2013/0061310 | A1 | 3/2013 | Whitmyer, Jr. | |
| 2014/0082071 | A1* | 3/2014 | Rexer | G06F 21/6245 |
| | | | | 709/204 |
| 2014/0282859 | A1* | 9/2014 | Narendra | G06Q 20/3221 |
| | | | | 726/1 |
| 2014/0304765 | A1* | 10/2014 | Nakamoto | H04L 63/20 |
| | | | | 726/1 |
| 2015/0039908 | A1* | 2/2015 | Lee | G06F 21/45 |
| | | | | 713/193 |
| 2015/0058969 | A1* | 2/2015 | Ringdahl | H04L 47/72 |
| | | | | 726/15 |
| 2015/0281161 | A1* | 10/2015 | Costecalde | H04L 51/22 |
| | | | | 709/206 |
| 2015/0339136 | A1* | 11/2015 | Suryanarayanan | G06F 9/455 |
| | | | | 718/1 |
| 2015/0339474 | A1* | 11/2015 | Paz | G06F 21/35 |
| | | | | 713/185 |
| 2015/0378704 | A1* | 12/2015 | Davis | H04L 67/16 |
| | | | | 709/217 |
| 2016/0004741 | A1* | 1/2016 | Johnson | G06Q 50/16 |
| | | | | 707/609 |
| 2016/0034267 | A1* | 2/2016 | Wetzold | H04L 67/10 |
| | | | | 717/172 |
| 2016/0065672 | A1* | 3/2016 | Savage | H04L 67/1095 |
| | | | | 709/219 |
| 2016/0080364 | A1* | 3/2016 | Karimzadeh | G06F 21/606 |
| | | | | 726/6 |
| 2016/0330177 | A1* | 11/2016 | Singleton, IV | G06F 21/554 |
| 2016/0337346 | A1* | 11/2016 | Momchilov | G06F 21/34 |
| 2017/0031891 | A1* | 2/2017 | Polega | G06N 5/04 |
| 2017/0180351 | A1* | 6/2017 | Lu | H04L 67/146 |
| 2017/0200122 | A1* | 7/2017 | Edson | H04L 63/104 |
| 2018/0308029 | A1* | 10/2018 | Loffler | H04L 67/306 |
| 2018/0322183 | A1* | 11/2018 | Feijoo | H04L 63/0815 |
| 2019/0068390 | A1* | 2/2019 | Gross | H04L 12/1827 |
| 2019/0235773 | A1* | 8/2019 | Schmisseur | G06F 3/0659 |
| 2019/0317781 | A1* | 10/2019 | Suryanarayanan | G06F 9/452 |
| 2019/0361697 | A1* | 11/2019 | Hu | G06F 11/3051 |
| 2020/0097337 | A1* | 3/2020 | Borkar | G06F 16/958 |
| 2020/0272484 | A1* | 8/2020 | Kunene | H04L 67/025 |
| 2020/0356618 | A1* | 11/2020 | Shribman | G06F 16/955 |
| 2020/0382629 | A1* | 12/2020 | Reagan | G06F 21/31 |
| 2020/0389469 | A1* | 12/2020 | Litichever | H04L 63/1425 |
| 2021/0099874 | A1* | 4/2021 | Suraparaju | H04W 12/0471 |

OTHER PUBLICATIONS

Landman, Max. "Managing smart phone security risks." In 2010 Information Security Curriculum Development Conference, pp. 145-155. 2010. (Year: 2010).*

Kim, Hyunwoo, and Steven C. Timm. "X. 509 authentication and authorization in fermi cloud." In 2014 IEEE/ACM 7th International Conference on Utility and Cloud Computing, pp. 732-737. IEEE, 2014. (Year: 2014).*

Bonacic, Cristian, Andres Neyem, and Andrea Vasquez. "Live ANDES: mobile-cloud shared workspace for citizen science and wildlife conservation." In 2015 IEEE 11th International Conference on e-Science, pp. 215-223. IEEE, 2015. (Year: 2015).*

Terada, Masayuki, Kozo Noaki, and Kimihiko Sekino. "Smartcard-based micro-billing scheme to activate the market for user-generated content." In Proceedings of the 4th International Conference on Uniquitous Information Management and Communication, pp. 1-8. 2010. (Year: 2010).*

Moudgil, Kartik, Ria Maheshwari, Harshal Bharatkumar Parekh, and Kailas Devadkar. "Cloud-based secure smartcard healthcare monitoring and tracking system." In 2017 second international conference on electrical, computerand communication technologies (ICECCT), pp. 1-8. IEEE, 2017. (Year: 2017).*

Gouveia, Joao, Paul Andrew Crocker, Simao Melo de Sousa, and Ricardo Azevedo. "E-id authentication and uniform access to cloud storage service providers." In 2013 IEEE 5th International Conference on Cloud Computing Technology and Science, vol. 1, pp. 487-492. IEEE, 2013. (Year: 2013).*

Patent Cooperation Treaty, Notification of Transmittal of the International Search Report and Written Opinion regarding International Application No. PCT/US2019/054497, dated Jun. 26, 2020.

Francoeur, "Mobility First", Blue Line, dated Jun. 18, 2019, Retrieved from the Internet: URL: https://www.blueline.ca/mobility-first/ [retrieved on Feb. 27, 2020].

Madden, "More Notes from Citrix Synergy 2019: Cloud Resilience, UEM Strategy, IGEL, Samsung, and More", Brian Madden, published Jun. 6, 2019, Retrieved from the Internet: URL: https://www.brianmadden.com/opinion/More-Citrix-Synergy-2019-coverage-on-IGEL-Samsung-and-others [retrieved Feb. 27, 2020].

FSET Information Technology, "Mobility First", YouTube, uploaded May 7, 2019, Retrieved from the Internet: URL: https://www.youtube.com/channe/UCZwjXKdk8VEdltfogGtPC8A [retrieved on Feb. 27, 2020].

Bradford, "#MobilityFirst: Doing More, With Less", FSET Information Technology, dated Sep. 3, 2019, Retrieved from the Internet: URL: http://mediaedgedigital.com/supplierinsights/oacp/mobilityfirst-doing-more-with-less/ [retrieved on Feb. 27, 2020].

* cited by examiner

SYSTEM AND METHOD OF SECURING ACCESS TO A SECURE REMOTE SERVER AND DATABASE ON A MOBILE DEVICE

FIELD OF THE INVENTION

The present disclosure generally relates to a system and method for reliably, securely, and affordably isolating and securing remote access to a secure cloud-based server and database, specifically, a Niche Records Management System (RMS) police database through a secured application, such as the NicheRMS application, over a secure networked connection, such as a Citrix Independent Computing Architecture (ICA) connection, wherein the law enforcement data is accessed, from a thin client device or a mobile device, and is only present within, the secured application front-end, and is never transmitted to or stored on the thin client or mobile device.

BACKGROUND OF THE DISCLOSURE

As background, secure databases, such as sensitive law enforcement databases, including any software associated with those databases, have previously only been accessible through a Windows client workstation on premise or over a client virtual private network ("VPN") connection. As such, when a user is away from his client workstation and needs to access the sensitive database using a VPN-enabled device, such as a laptop computer, it is nearly impossible to reliably due to connectivity issues. As such there is a need for a system that enables a user to reliably access the secure database when in the field, without requiring the individual to access a VPN-enabled device.

One example of a secure database system is the NicheRMS system, which stores law enforcement-related information in one central location. NicheRMS, or other similar systems, are commonly used by police departments throughout the world. These systems, which include software, provide the ability to record data, retrieve data, and view data through a user interface at an on-premise workstation or via a VPN-enabled device. For example, a VPN-enabled laptop is required to be stationed in a police officer's vehicle while in the field to properly maintain VPN connectivity. The requirement for VPN connectivity limits availability to the NicheRMS system due to poor connectivity. As such, when a user loses connectivity to the VPN, the user must re-establish a VPN connection to the NicheRMS system, however, any unsaved data is lost. This requirement leads to inefficient data update processes, and it is cost prohibitive.

Using the NicheRMS system as used in Ontario, Canada as an example, every public safety agency headquarter has one or more VPN connections to Ontario Police Technology Information Co-operative (OPTIC), the site of the shared, single NicheRMS system. These connections allow local workstations throughout Ontario to access resources from the shared NicheRMS database, such as the Ontario Sex Offender Registry (OSOR), the Canadian Police Information Centre (CPIC/CJIM), which is a database of criminal records and fingerprints, and the PKIWeb/IGSelfserve OPTIC Certificate Authority secure portals. The PKIWeb/IGSelfserve OPTIC Certificate Authority secure portals may be used to manage PKI credentials issued to police officers and stored on their smartcards. Police officers have had to rely on a client VPN-enabled Mobile Data Terminals (MDT) in their vehicle to maintain access to these resources when external to the detachment (i.e., the client workstation). The main challenges encountered through using a client VPN are bandwidth issues and connectivity instability, because packet loss can result in termination of the session. These issues can lead to potential data loss and duplication of effort when there is a need to complete previously completed entries. These inefficiencies result in an increase in labor costs due to the loss of productivity by safety personnel in the field who need to return to the detachment to complete the lost information. Another issue encountered is that the secure data contained in the shared NicheRMS database, which cannot be transmitted without being encrypted, becomes available in unencrypted form on mobile endpoint devices, which can result in complex mitigation actions for data loss prevention. Specifically, protected data is information or assets that, if compromised, could cause serious injury to an individual, organization, or government.

To date, the only way to access secure law enforcement databases in the field is to use a Windows laptop in a cruiser to create a VPN connection, and then exchange full data between the laptop and the database system through the VPN. However, that solution leads to all of the potential issues previously described. As such, a solution is needed to enable a person in the field to reliably and cost-effectively access the sensitive database when using mobile endpoint devices while still maintaining the required level of security.

There have been attempts to use session-hosted desktops; however, these attempts have failed at the smartcard pass-through authentication mechanism, rendering all of the previously mentioned OPTIC-provided resources inaccessible and unusable. The failure was caused by competing services in Citrix XenAPP and VMware Horizon View, which blocked access to the smartcard. Until now, this limitation has prevented the adoption of session-hosted desktop access to OPTIC resources.

Specifically, to enable a non-VPN connected system to access the sensitive law enforcement database, the system requires support for a common access card (CAC), which performs multifactor authentication verification, but not login capability, and a personal identity verification (PIV) card, which is a smartcard that contains the card holder's PKI credentials that are necessary to login to secure database system and establish the appropriate level of security for all applicable applications.). Until now, this has not been possible.

The present invention solves the prior shortcomings of the current systems on the market and in use, including the inability of persons to reliably and cost-effectively access secure databases while in the field. Specifically, the present invention discloses a new and novel system and method that implements functioning smartcard pass-through authentication to the secure database system, for example, a Citrix session, that supports both common access card (CAC) and personal identity verification (PIV).

This new system has a plethora of advantages not possible in the current systems. For example, the new system provides the ability to use thin clients and mobile devices lessens the costs to the user by enabling the user to move away from Windows endpoints (desktop/laptop), which require costly updating approximately every four years. Also, the new system improves overall security by preventing data from ever existing on the endpoint. Thus, if a device is lost or stolen there is no threat to loss of information or security breach is nonexistent. Additionally, the user has flexibility of work location, and in turn better continuity of business, and productivity. As long as there is an internet connection, the system can by run. This is very important in emergency type situations where the user's main business location may be inaccessible and the user must work from the field.

SUMMARY OF THE DISCLOSURE

In one aspect, a method for connecting to a secure database through a cloud workspace comprising, authenticating a user, the user utilizing a user device, having affirmatively authenticated the user, establishing a first secure connection between the user device and a cloud workspace; having established the first secure connection, accessing the cloud workspace having a secured application client by the user, the secured application client being a software that when launched, causes the cloud workspace to establish a second secure connection to a secure database system requiring two-factor authentication to access the secure database and having a secured application server software; having accessed the cloud workspace, launching the secured application client by the user, wherein the secured application client, when in communication with the secured application server software, disables the two-factor authentication requirement of the secure database system such that the user, having previously been affirmatively authenticated, obtains access to the secure database.

In one aspect, a system for connecting a cloud workspace containing a client's private data and systems to a secured cloud database comprising: a user device, the user device, once authenticated, forming a first secure connection to a server infrastructure; at least one cloud workspace, the cloud workspace being a virtualized operating system having a secured application client, connected to a first VLAN wherein the first VLAN is a client-dedicated segregated VLAN, and stored in at least one non-volatile memory on server infrastructure, the server infrastructure having a hypervisor, the hypervisor managing one or more cloud workspace and one or more VLAN, the server infrastructure further passing the first secure connection to the cloud workspace; the first VLAN enabling a connection to a site-to-site secure connection client, the site-to-site secure connection client establishing a second secure connection to a site-to-site secure connection server on a secure database system; the secure database system having the site-to-site secure connection server, a secured application server, and a secure database, the secure database system having a two-factor authentication requirement to access the secure database, the secure application server being a software application that, when accessed by the secure application client, disables the two-factor authentication requirement.

In one aspect, a server infrastructure comprising: a plurality of servers, each server comprising: one or more processor; one or more communication component, the communication component configured to accept a first secure connection from a user device to a cloud workspace, the first secure connection established by a cloud workspace client application on the user device and based at least in part on a smartcard authenticator, the communication component further configured to request a second secure connection between a site-to-site secure connection client accessed by a secured application client and a site-to-site secure connection server on a secure database system having a secure database and a secured application server; one or more non-volatile memory, the non-volatile memory storing at least a cloud workspace, the cloud workspace being a virtualized operating system configured to execute the secured application client, the secured application client being computer code that when executed by a processor, causes the processor to establish the second secure connection to the secure database system and remove the two-factor authentication requirement from the secure database system by causing the secured application server computer code to be executed; one or more modem, the modem configured to establish the internet connection with at least one internet service provider; and, one or more network switch, each of the one or more network switch configured to segregate each user connection within a virtual local area network and configured to enable data communication between each of the plurality of servers and the one or more modem.

In one aspect, a secure device comprising: a wireless transceiver; a microprocessor coupled to the wireless transceiver; a digital storage element on element coupled to the microprocessor and storing logic that when executed by the microprocessor causes the microprocessor to: receive a request to connect to a secured database from a secured application on a cloud server workspace; route the request to the wireless transceiver; enable the wireless transceiver to transmit the request to one or more secured database servers; receive a response from the wireless transceiver from the one or more secured database servers for authentication; generate a request to the secured application for authentication; route the request for authentication to the secured application; receive a response from the secured application that its monitoring function is disabled; route the response to the wireless transceiver; enable the wireless transceiver to transmit the response to one or more secured database servers; receive a response from the wireless transceiver from the one or more secured database for two-factor authentication.

BRIEF DESCRIPTION OF THE DRAWINGS

The accompanying drawings, which are incorporated in and constitute a part of this specification, illustrate one or more implementations described herein and, together with the description, explain these implementations. The drawings are not intended to be drawn to scale, and certain features and certain views of the figures may be shown exaggerated, to scale or in schematic in the interest of clarity and conciseness. Not every component may be labeled in every drawing. Like reference numerals in the figures may represent and refer to the same or similar element or function. In the drawings.

DETAILED DESCRIPTION

All illustrations of the drawings are for the purpose of describing selected versions of the present invention and are not intended to limit the scope of the present invention. The invention is not limited in its application to the details of the components and arrangements as described or illustrated. The invention is capable of other embodiments and of being utilized and carried out in various ways.

As used herein, the terms first, second, third, and the like are used to distinguish between similar elements and not necessarily for describing a specific sequential or chronological order. The terms are interchangeable under appropriate circumstances and the embodiments of the invention can operate in other sequences than described or illustrated herein.

As used in the description herein, the terms "comprises," "comprising," "includes," "including," "has," "having," or any other variations thereof, are intended to cover a non-exclusive inclusion. For example, unless otherwise noted, a process, method, article, or apparatus that comprises a list of elements is not necessarily limited to only those elements, but may also include other elements not expressly listed or inherent to such process, method, article, or apparatus.

Further, unless expressly stated to the contrary, "or" refers to an inclusive and not to an exclusive "or". For example, a condition A or B is satisfied by one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or more, and the singular also includes the plural unless it is obvious that it is meant otherwise. Further, use of the term "plurality" is meant to convey "more than one" unless expressly stated to the contrary.

As used herein, qualifiers like "substantially," "about," "approximately," and combinations and variations thereof, are intended to include not only the exact amount or value that they qualify, but also some slight deviations therefrom, which may be due to computing tolerances, computing error, manufacturing tolerances, measurement error, wear and tear, stresses exerted on various parts, and combinations thereof, for example.

The use of the term "at least one" or "one or more" will be understood to include one as well as any quantity more than one. In addition, the use of the phrase "at least one of X, V, and Z" will be understood to include X alone, V alone, and Z alone, as well as any combination of X, V, and Z.

Circuitry, as used herein, may be analog and/or digital components, or one or more suitably programmed processors (e.g., microprocessors) and associated hardware and software, or hardwired logic. Also, "components" may perform one or more functions. The term "component," may include hardware, such as a processor (e.g., microprocessor), an application specific integrated circuit (ASIC), field programmable gate array (FPGA), a combination of hardware and software, and/or the like. The term "processor" as used herein means a single processor or multiple processors working independently or together to collectively perform a task.

Software may include one or more computer readable instructions that when executed by one or more components cause the component to perform a specified function. It should be understood that the algorithms described herein may be stored on one or more non-transitory computer readable medium. Exemplary non-transitory computer readable mediums may include random access memory, read only memory, flash memory, and/or the like. Such non-transitory computer readable mediums may be electrically based, magnetically based, optically based, and/or the like.

As used herein, a network switch is a network device configured to connect one or more devices together to form a computer network, thereby enabling the transfer of data from a first connected device to a second connected device. A network switch may provide a plurality of network interfaces, such as Ethernet, Fibre Channel, RapidIO, ATM, ITU-T G.hn and 802.11. A network switch may operate at one or more layer, including layer 1, layer 2, layer 3, layer 4, or layer 7. Additionally, a network switch may include an unmanaged switch, a managed switch, including enterprise managed switch, and/or a smart (or intelligent) switch.

In addition, the terms top, bottom, front, rear, left, right, upper, lower, and the like as used herein are used for descriptive purposes and not necessarily for describing specific positions. The terms so used are interchangeable under appropriate circumstances and the embodiments described herein can operate in orientations other than described or illustrated herein.

Furthermore, the phrasing and terminology employed are for the purpose of description and should not be regarded as limiting. As such, the present invention is primarily used in conjunction with securely accessing police and safety secured databases; however, the invention may be used in conjunction to provide secure access to other types of secured databases.

As used herein, the term "client" is used to refer to a company, business, organization, sole individual who may utilize the system in its day to day business-type activities, while a "user" as used herein is the individual using the system.

Figure 1:
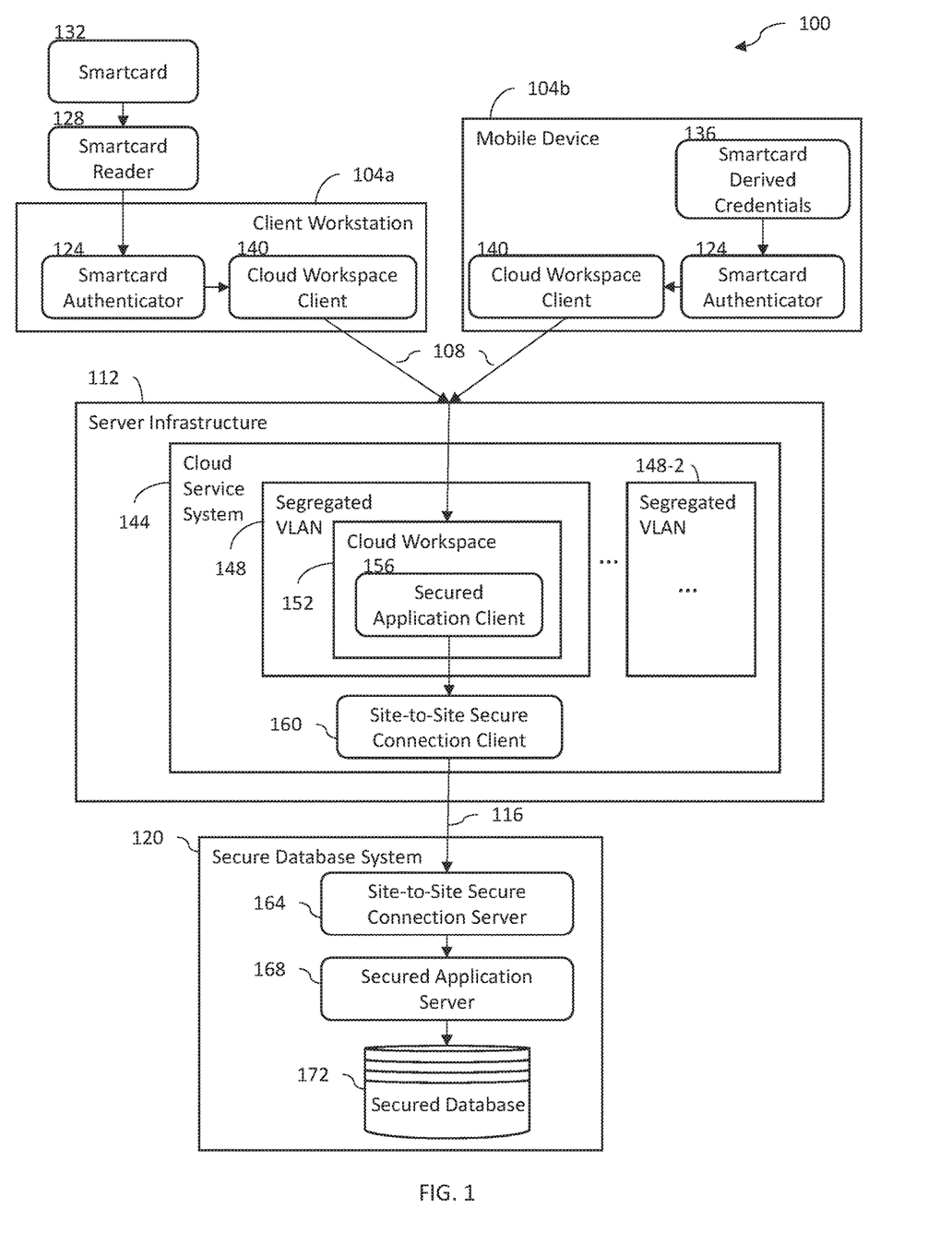
FIG. 1 is a diagram of an exemplary embodiment of a system of securing access to a secure remote server and database.

Referring now to FIG. 1, shown therein is the secure access system 100. The secure access system 100 generally consists of one or more client device 104, such as a client workstation 104*a* or a mobile device 104*b*, that forms a first secure connection 108 to a server infrastructure 112, which, in turn, forms a second secure connection 116 to a secure database system 120. In order to form the first secure connection 108, the client device 104 authenticates user credentials utilizing a smartcard authenticator 124. In one embodiment, such as where the client device 104 is the client workstation 104*a*, the smartcard authenticator 124 authenticates smartcard credentials from a smartcard reader 128 reading a smartcard 132. In another embodiment, such as where the client device 104 is the mobile device 104*b*, the smartcard authenticator 124 authenticates smartcard derived credentials 136. Once the smartcard authenticator 124 authenticates the user credentials, the user is provided access to a cloud workspace client application 140. The cloud workspace client application 140 then forms the first secure connection 108 to the server infrastructure 112. The smartcard derived credentials 136 are stored on the mobile device 104*b*. In one embodiment, Citrix Workspace (Citrix Systems, Inc., Fort Lauderdale, Fla.) uses the smartcard derived credentials 136 and a user personal identification number (PIN) to authenticate the user and unlock the credentials.

The client workstation 104*a* may include, but is not limited to, a desktop computer, a desktop terminal, or a laptop computer. The mobile device 104*b* may include, but is not limited to, a cell phone, a personal data assistant (PDA), a tablet, or a laptop computer. In other embodiments, the client device 104 is any of a number of endpoints and/or operating systems including a desktop, laptop, tablet, mobile device, thin client, iOS (Apple Inc., Cupertino, Calif.), Android (Google LLC, Mountain View, Calif.), Windows (Microsoft Corporation, Redmond, Wash.), MAC (Apple Inc., Cupertino, Calif.), Linux, or any other types of endpoints and/or operating systems known in the art, or which may offer the same functionality as the endpoints and operating systems identified herein.

The first secure connection 108 may be a virtual private network connection (VPN). The first secure connection 108 may utilize one or more encryption algorithms to encrypt the connection between the client device 104 and the server infrastructure 112. In one embodiment, the encryption algorithm used is determined by the connection between the cloud workspace client application 140 and the cloud workspace 152. In another embodiment, the first secure connection 108 is a dedicated connection between the client device 104 and the server infrastructure 112. The first secure connection 108 may connect to a first network. In one embodiment, the first network is the Internet and the client devices interface with the server infrastructure via a series of web pages or through custom protocols utilized by the cloud workspace client application 140. It should be noted, however, that the first network may be almost any type of network and may be implemented as the World Wide Web (or Internet), a local area network (LAN), a wide area network (WAN), a metropolitan network, a wireless network, a cellular network, a Global System for Mobile Communications (GSM) network, a code division multiple access (CDMA) network, a 3G network, a 4G network, an LTE network, a 5G network, a satellite network, a radio network, an optical network, a cable network, a public switched telephone network, an Ethernet network, combinations thereof, and/or the like. It is conceivable that in the near future, embodiments of the present disclosure may use more advanced networking topologies. In another embodiment, the first secure connection is established through a firewall, such as, but not limited to, a 2xMeraki MX250 provided by Cisco Systems, San Jose, Calif.

The server infrastructure 112 accepts the first secure connection 108 based, at least in part, on the user credentials authenticated by the smartcard authenticator 124. The server infrastructure 112 may include at least a gateway, a firewall, a router, and a user authenticator. In one embodiment, the server infrastructure 112 compares the user credentials against the user authenticator to determine one or more systems to which the user has authorization to access. The server infrastructure 112 connects the user to a cloud service system 144. The cloud service system 144 connects the user to a segregated VLAN 148 based at least in part on the user credentials and/or the user authenticator and hosts the cloud workspace 152 that is connected to the segregated VLAN 148.

In one embodiment, the server infrastructure 112 is a hyper-converged infrastructure (HCI), which virtualizes all of the elements of conventional "hardware-defined" systems (i.e., a private cloud infrastructure). This is, all components contained within the server infrastructure 112, including the cloud service system 144, the segregated VLAN 148, the second segregated VLAN 148-2, the cloud workspace 152, the secured application client 156, the site-to-site secure connection client 160 and any other component operating on the server infrastructure 112 may be virtualized. In one embodiment, the HCI is a four node 2U hyper-converged compute and storage cluster, such as a Nutanix acropolis hypervisor provided by Nutanix, San Joes, Calif. Storage within the HCI may be a hybrid of flash and mechanical self-encrypting drives that store hot and cold data respectively. This ensures that all data at rest and in transit is encrypted, end-to-end, creating a private cloud. The HCI may host multiple segregated VLAN 148, 148-2 where each VLAN provides the ability to segregate private data of various clients and services. In one environment, the server infrastructure 112 includes a backup VLAN, that is, a segregated VLAN network that allows a backup software appliance virtual machine access to the HCI for block level backups to a hyper-converged storage backup appliance. The backup software appliance in the backup VLAN prevents loss of data associated, such as that associated with corruption of the data or destruction of the hardware. In one such embodiment, the backup software appliance virtual machine is provided by HYCU, Boston, Mass. and the hyper-converged storage backup appliance is provided by ExaGrid, Westborough, Mass. By utilizing the hyper-converged infrastructure, as opposed to other general-purpose cloud service providers such as Microsoft Azure (Microsoft Corporation, Redmond, Wash.) or Amazon Web Services (AWS, Amazon Web Services, Inc., Seattle, Wash.), the server infrastructure 112 further maintains security by controlling what services and connections have access to the server infrastructure 112.

The segregated VLAN 148 is a virtual local area network formed within a local area network (LAN) such that the user accessing the segregated VLAN 148 only has access to resources connected to the segregated VLAN 148 but not to other resources connected to the LAN or other segregated VLANs. For example only and not by way of limitation, if a user is connected to only a first segregated VLAN on a LAN, a server is connected to only a second segregated VLAN on the LAN, and a storage device is connected to only the LAN, the user would be unable to access the server or the storage device; likewise, neither the server nor the storage device would be able to connect to the user.

In one embodiment, the cloud service system 144 is a virtual cloud service system hosted on the server infrastructure 112. The virtual cloud service system may be one or more application or one or more virtual machine configured to execute one or more application that is executed on at least one physical computer having at least one processor. The virtual machine includes virtualized computer hardware hosted on one or more non-virtualized computer hardware. Computer hardware may include one or more processor, non-volatile memory, and/or a communication component. In one embodiment, the segregated VLAN 148 operates on non-virtualized hardware, such as a hardware component of the server infrastructure 112. In another embodiment, the segregated VLAN 148 operates on virtualized hardware such as a virtualized communication component and/or a virtualized switch. In yet another embodiment, the segregated VLAN 148 operates on both at least one non-virtualized hardware and at least one virtualized hardware. The cloud service system 144 may host one or more segregated VLAN 148, such as segregated VLAN 148-2. In one embodiment, the cloud service system 144 includes one or more of a Citrix Hypervisor, formerly XenServer, a Citrix Gateway Service, and/or a Netscaler Service (Citrix Systems, Inc, Fort Lauderdale, Fla.).

In one embodiment, the cloud workspace 152 is a virtual cloud workspace, that is, the cloud workspace 152 is virtualized on the server infrastructure 112. The cloud workspace 152 hosts a secure application client 156. The secure application client 156 is a computer application executed by one or more processer of the cloud workspace 152. In another embodiment, the secure application client 156 is a computer application running within a virtualized container. In another embodiment, the segregated VLAN 148 connects more than one cloud workspace 152 and each of the cloud workspaces 152 is a cloned Microsoft Server 2016 Virtual Machine from a Citrix Master Image, which is configured to the client's specifications and requirements and pre-loaded with any applications required by that particular client to properly function. All updates (software and OS) are completed on the Virtual Machine whereby the Virtual Machine is shut down, a Snapshot is taken of the current state of the Virtual Machine and then cloned to the number of cloud workspaces 152 required for the size of the client including a minimum of two running and registered cloud workspaces 152. Once the one or more cloud workspaces 152 are created, the cloud workspaces 152 power on and register with the cloud service system 144 such that they are ready to accept logins from at least one client. In a preferred embodiment, all work performed by the client on secured database 172 is completed through the cloud workspace 152. The cloud workspaces 152 are disposable, that is, they destroy themselves daily and are recreated when the user forms a new first secure connection 108, thereby ensuring the cloud workspace 152 maintains integrity by reverting any configurations made by the user to a default state defined by the state of the virtual machine when it was most recently formed. In one embodiment, the cloud workspace 152 is enabled by XenApp and XenDesktop services, provided by Citrix Systems, Inc, Fort Lauderdale, Fla.

The secured application client 156 forms the second secure connection 116 to the site-to-site secure connection client 160. In one embodiment, the site-to-site secure connection client 160 is the only connection client that can form the second secure connection 116 to a site-to-site secure connection server 164 on the secure database system 120. In another embodiment, the site-to-site secure connection server 164 will reject any attempt to form the second secure connection 116 if the second secure connection 116 does not originate from a pre-determined device. The pre-determined device may be limited by the IP address of the pre-determined device, including either the IPv4 or the IPv6 address, and/or the MAC address of the pre-determined device, that is the media access control address. Once the second secure connection 116 is formed between the site-to-site secure connection client 160 and the site-to-site secure connection server 164, the user can access a secured application server 168 with the secured application client 156. The user can then utilize the connection to the secured application server 168 to connect to a secured database 172.

The second secure connection 116 may be a virtual private network connection (VPN). The second secure connection 116 may utilize one or more encryption algorithms to encrypt the connection between the site-to-site secure connection client 160 and the site-to-site secure connection server 164. The one or more encryption algorithms may include, for example only, IPSec (IETF, LLC, Reston, Va.) and/or OpenTLS (OpenSSL Software Foundation, Newark, Del.). In another embodiment, the second secure connection 116 is a dedicated connection between the site-to-site secure connection client 160 and the site-to-site secure connection server 164. The second secure connection 116 may connect to a second network. In one embodiment, the second network is the Internet and the site-to-site secure connection client 160 interfaces with the site-to-site secure connection server 164 via a series of web pages or through custom protocols utilized by the site-to-site secure connection server 164. It should be noted, however, that the second network may be almost any type of network and may be implemented as the World Wide Web (or Internet), a local area network (LAN), a wide area network (WAN), a metropolitan network, a wireless network, a cellular network, a Global System for Mobile Communications (GSM) network, a code division multiple access (CDMA) network, a 3G network, a 4G network, an LTE network, a 5G network, a satellite network, a radio network, an optical network, a cable network, a public switched telephone network, an Ethernet network, combinations thereof, and/or the like. It is conceivable that in the near future, embodiments of the present disclosure may use more advanced networking topologies. In another embodiment, the second network is the same as the first network. In another embodiment, the second secure connection is established through a firewall, such as, but not limited to, a 2xMeraki MX250 provided by Cisco Systems, San Jose, Calif.

As disclosed above and in FIG. 1, any data on the secured database 172 is not copied or saved locally to the client device 104. The network architecture disclosed above and in FIG. 1 prevent access to the secured database 172 by unauthorized users who may have access to one or more client device 104 through either innocent or nefarious means, even if the unauthorized user has root or administrator access to the client device 104. Further, the site-to-site secure connection client 160 connection information is not known by or stored on the client device 104 thereby preventing unauthorized users from determining connection information for the second secure connection even if the unauthorized user has access to the client device 104. Additionally, because the connection to the secured database 172 is formed with the secured application client 156 on the cloud workspace 152, if the client device 104, being either the client workstation 104a or the mobile device 104b, loses connection to the server infrastructure 112, the connection to the secure database system 120 would not be reset and all work done on the cloud workspace 152 would not be lost as it would still be available when the client connects to the server infrastructure 112 the next time.

Figure 2:
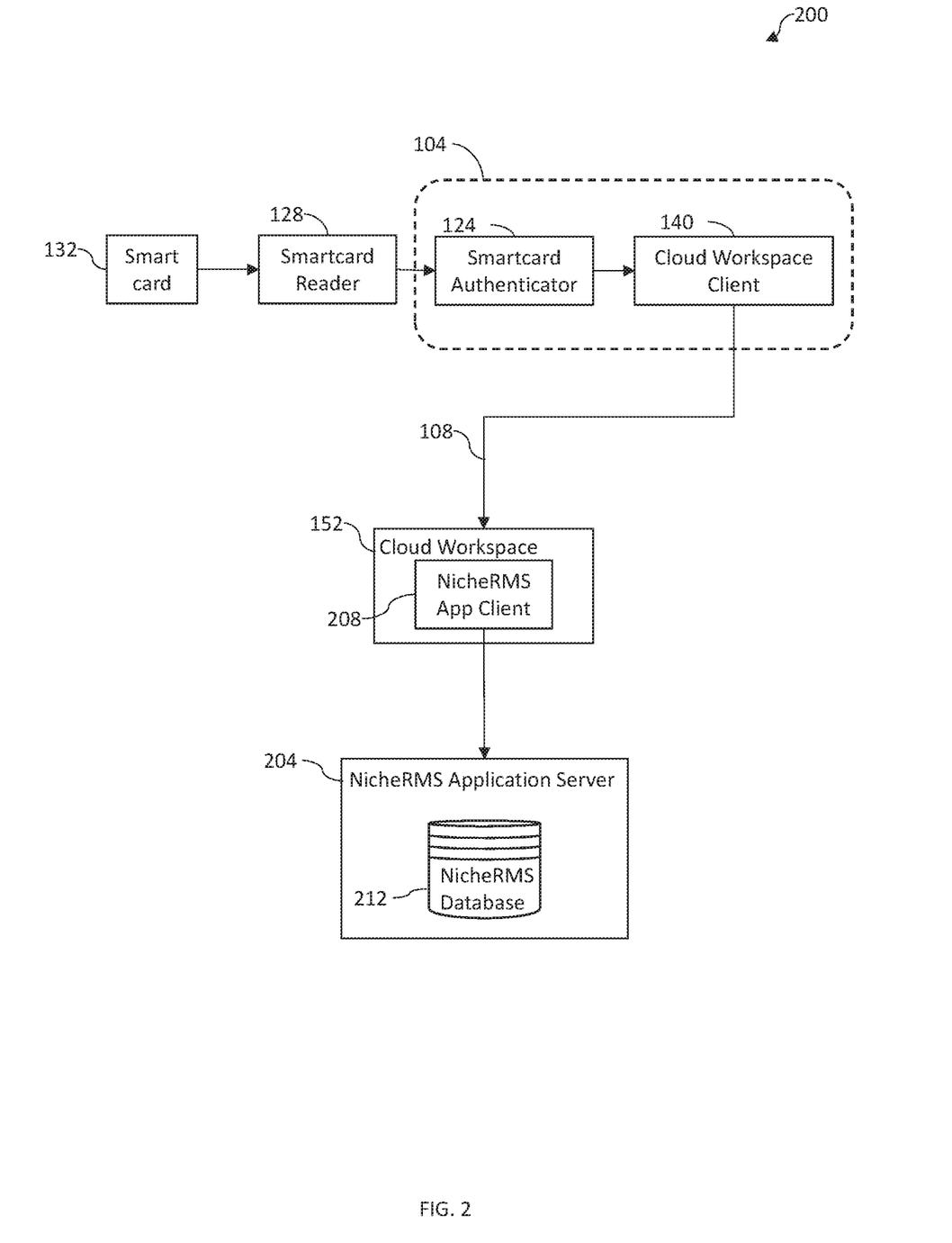
FIG. 2 is a flow chart of an exemplary embodiment of a user authentication and remote access process of the present invention.

As shown in FIG. 2, the system connects various platforms together in a way that maintains a secure and reliable cloud-based connection when utilizing a NicheRMS application server 204 (secured application server 168), thus protecting the integrity of the data stored on the NicheRMS database 212 and exchanged over the one or more cloud-based connections.

Referring now to FIG. 2, shown therein is a secure application server connection diagram 200. As shown in the secure application server connection diagram 200, to enable a user to access the NicheRMS application server 204 through the cloud workspace 152 utilizing the client device 104, the user must use the smartcard 132 with the smartcard reader 128 which is connected directly to the client device 104 (e.g., desktop, laptop, tablet, mobile device, thin client, etc.).

In a preferred embodiment, the smartcard authenticator 124, the smartcard reader 128, and the smartcard 132 enable the user to authenticate over a cloud workspace session started by the cloud workspace client application 140 to the cloud workspace 152. The authentication process commences when the user launches the cloud workspace client application 140, which launches the smartcard authenticator 124. The smartcard authenticator 124 instructs the user to insert the smartcard 132 into the smartcard reader 128. The smartcard authenticator 124 reads, via the smartcard reader 128, the user credentials stored on the smartcard 132 and completes the authentication process on behalf of the cloud workspace client application 140. If the authentication process is successful, the first secure connection 108 is established between the cloud workspace client application 140 and the cloud workspace 152 thereby providing the user access to the cloud workspace 152 and thus, a virtual desktop environment hosting a NicheRMS application client 208. If the authentication process is unsuccessful, the first secure connection 108 is not established. In one embodiment, the smartcard authenticator 124 is the Entrust Datacard (Entrust Datacard Corporation, Minneapolis, Minn.) smartcard application. In another embodiment, the smartcard authenticator 124 is software or firmware integrated into the smartcard reader 128.

Upon successful user authentication and subsequent access to the cloud workspace 152 a virtual desktop environment is established thereby enabling the user to authenticate and launch the NicheRMS application client 208 which establishes the second secure connection 116 to the NicheRMS application server 204. The user can then interact with the NicheRMS database 212. Specifically, in a preferred embodiment, the NicheRMS application server 204 contains the line of code: "TLSSmartcardMonitorEnable=0", which disables the smartcard monitoring function of the NicheRMS application server 204 and allows the user to launch the NicheRMS application client 208 and work with the NicheRMS database 212, on the basis of smartcard pass-through authentication. Thus, the NicheRMS application client 208 is running in the cloud workspace 152. Therefore, if the first secure connection 108 is closed between the client device 104 and the cloud workspace 152, the NicheRMS application client 208 continues running unaffected in the cloud workspace 152. In the case that the first secure connection 108 is closed, the user simply has to re-establish the first secure connection 108 between the client device 104 and the cloud workspace 152 and continue working within the virtual desktop environment on the cloud workspace 152 where the user left off when the connection was closed, thus avoiding data integrity issues and reducing the chance of repeating work that may not have been saved within the NicheRMS database 212.

In another embodiment, a two-factor authentication process is completed using derived credentials, which, through an enrollment process, are derived from the user credentials located on the smartcard 132, and permanently stored on a mobile device for subsequent authentication when the user launches the cloud workspace client application 140. The remainder of the authentication and remote access process is identical to the process described above when using the smartcard reader connected to the client device 104.

Although the invention has been explained through the Figures in relation to its preferred embodiment, it is to be understood that many other possible modifications and variations can be made without departing from the spirit of the scope of the invention.

The foregoing description provides illustration and description, but is not intended to be exhaustive or to limit the inventive concepts to the precise form disclosed. Modifications and variations are possible in light of the above teachings or may be acquired from practice of the methodologies set forth in the present disclosure.

Even though particular combinations of features are recited in the claims and/or disclosed in the specification, these combinations are not intended to limit the disclosure. In fact, many of these features may be combined in ways not specifically recited in the claims and/or disclosed in the specification. Although each dependent claim listed below may directly depend on only one other claim, the disclosure includes each dependent claim in combination with every other claim in the claim set.

No element, act, or instruction used in the present application should be construed as critical or essential to the invention unless explicitly described as such outside of the preferred embodiment. Further, the phrase "based on" is intended to mean "based, at least in part, on" unless explicitly stated otherwise.

We claim:

1. A method for connecting to a secure database through a cloud workspace comprising,
affirmatively authenticating a user via a smartcard authenticator application comprising at least the steps of:
receiving by a smartcard authenticator application a correct personal identification number input from the user that matches a smartcard derived credentials;
connecting a user device to a smartcard reader;
affirmatively authenticating the user by the smartcard authenticator provided the user inserts a smartcard having an assigned user into the smartcard reader and the smartcard authenticator;
reading the smartcard; and
establishing that the user assigned to the smartcard has permissions to access the cloud workspace;
establishing a first secure connection between the user device and a cloud workspace;
accessing the cloud workspace having a secured application client by the user, the secured application client being a software that when launched, causes the cloud workspace to establish a second secure connection to a secure database system requiring two-factor authentication to access the secure database and having a secured application server software;
launching the secured application client by the user, wherein the secured application client, when in communication with the secured application server software, disables the two-factor authentication requirement of the secure database system such that the user, having previously been affirmatively authenticated, obtains access to the secure database.

2. The method of claim 1 wherein the secured application client is a NicheRMS application.

3. The method of claim 1 wherein the secured database is a NicheRMS database.

4. The method of claim 1 wherein the two-factor authentication requirement is disabled through an addition of a code TLSSmartcardMonitorEnable=0 in the NicheRMS application.

5. The method of claim 1, wherein authenticating a user includes utilizing two-factor authentication.

6. The method of claim 1, wherein the user device is a mobile device.

7. The method of claim 1, wherein at least one of the first secure connection and the second secure connection is a virtual private network connection established across the internet.

8. The method of claim 1, wherein at least one of the first secure connection and the second secure connection is a dedicated connection.

9. A system for connecting a cloud workspace containing a client's private data and systems to a secured cloud database comprising:
a user device;
a smartcard having smartcard derived credentials and a smartcard authenticator, the smartcard configured to be inserted into a smartcard reader and connect to the user device;
the smartcard authenticator configured to receive a correct personal identification number input from the user that matches the smartcard derived credentials;
wherein the smartcard authenticator is further configured to affirmatively authenticate and establish that an user assigned to the smartcard has permissions to access the cloud workspace;
wherein the user device, once authenticated, configured to form a first secure connection to a server infrastructure;
wherein the first secure connection uses encryption algorithms to encrypt the connection between a client device and the server infrastructure;

at least one cloud workspace, the cloud workspace being a virtualized operating system having a secured application client, connected to a first VLAN wherein the first VLAN is a client-dedicated segregated VLAN, and stored in at least one non-volatile memory on server infrastructure, the server infrastructure having a hypervisor, the hypervisor managing one or more cloud workspace and one or more VLAN, the server infrastructure further passing the first secure connection to the cloud workspace;

the first VLAN confirmed to enable a connection to a site-to-site secure connection client, the site-to-site secure connection client establishing a second secure connection to a site-to-site secure connection server on a secure database system;

the secure database system having the site-to-site secure connection server, a secured application server, and a secure database, the secure database system having a two-factor authentication requirement to access the secure database, the secure application server being a software application that, when accessed by the secure application client, disables the two-factor authentication requirement; and wherein each of the one or more non-volatile memory is encrypted.

10. The system of claim 9, wherein the site-to-site secure connection server can only establish the second secure connection with the site-to-site secure connection client.

11. The system of claim 9, wherein the user device is a mobile device.

12. The system of claim 9, wherein at least one of the first secure connection and the second secure connection is a virtual private network connection established across the internet.

13. The system of claim 9, wherein at least one of the first secure connection and the second secure connection is a dedicated connection.

14. The system of claim 9, wherein the cloud workspace maintains the second secure connection if the first secure connection is closed.

15. The system of claim 9, wherein each of the at least one cloud workspace is deleted daily and wherein the at least one cloud workspace is formed by the server infrastructure upon formation of the first secure connection.

16. The system of claim 9, wherein the server infrastructure comprises one or more servers, each of the servers having one or more processor, one or more non-transitory memory, and one or more communication components.

17. The system of claim 9, wherein at least one of the first secure connection and the second secure connection is an encrypted connection.

18. A nontransitory computer readable medium storing instructions in a memory that, when executed by a processor, performs a computer implemented method comprising:

affirmatively authenticating a user via a smartcard authenticator application comprising at least the steps of:

receiving by a smartcard authenticator application a correct personal identification number input from the user that matches smartcard derived credentials;

connecting a user device to a smartcard reader;

affirmatively authenticating the user by the smartcard authenticator provided the user inserts a smartcard having an assigned user into the smartcard reader and the smartcard authenticator;

reading the smartcard; and establishing that the user assigned to the smartcard has permissions to access the cloud workspace;

establishing a first secure connection between the user device and a cloud workspace;

accessing the cloud workspace having a secured application client by the user, the secured application client being a software that when launched, causes the cloud workspace to establish a second secure connection to a secure database system requiring two-factor authentication to access the secure database and having a secured application server software;

launching the secured application client by the user, wherein the secured application client, when in communication with the secured application server software, disables the two-factor authentication requirement of the secure database system such that the user, having previously been affirmatively authenticated, obtains access to the secure database.

19. The nontransitory computer readable medium of claim 18, wherein at least one of the first secure connection and the second secure connection is a virtual private network connection established across the internet.

20. The nontransitory computer readable medium of claim 18, wherein at least one of the first secure connection and the second secure connection is a dedicated connection.

* * * * *